SINGLE CHANNEL TRANSMISSION SYSTEM

Filed Jan. 23, 1953

INVENTOR:
Floyd G. Steele
BY Walter J. Jason
ATTORNEY

United States Patent Office 2,912,684

Patented Nov. 10, 1959

2,912,684

SINGLE CHANNEL TRANSMISSION SYSTEM

Floyd G. Steele, La Jolla, Calif., assignor to Digital Control Systems, Inc., a corporation of California Application January 23, 1953, Serial No. 332,976

13 Claims. (Cl. 340—347)

The present invention relates to a single channel transmission system and, more particularly, to a system for simultaneously transmitting a binary digit information signal and a synchronizing clocking signal over a single channel.

Relatively log distance transmission of binary number information has become increasingly more important since the advent of present day binary digital computers. Such transmission may be required, for example, between a source of input binary information and a computer where the source lies at a considerable physical distance from the computer. On the other hand, output binary information or data produced by a computer may either be required as input information for another remotely positioned computer or may be required for controlling a remote mechanism.

In general, the output information produced by a binary digital computer is composed of two basic or major components. One component is a signal representing the actual digit values occurring in the numbers resulting from the computational operations performed by the computer with the other component being a synchronizing or timing signal serving, in turn, to distinguish or mark the consecutive digit values of each number. The digit signal generally comprises a series of high and low voltage levels, each high level marked by the timing signal representing a binary one value with each corresponding low level representing a binary zero value. In the past, it has been necessary to employ two separate channels for transmitting this type of computer output information, one channel containing the timing signal with the other channel containing the binary digit signal.

The device of the present invention serves to transmit both information components over a single channel and thereby cut in half the bandwidth previously required for transmitting the same quantity of information. This is accomplished broadly by combining the timing signal with the binary number signal by triggering a pair of flip-flop circuits such that their output signals, after being combined by a mixing circuit, comprise a series of voltage levels, each level being of a relatively high, low or medium magnitude and appearing for half a timing interval as marked by the original timing signal. Every other voltage level thus produced is of the medium magnitude with the remaining levels being either high or low and corresponding, in turn, to the binary values contained in the original binary information signal.

This series of levels produced by the mixing circuit are then converted into a form suitable for transmission over a prescribed medium or transmission path, such as a telegraph wire, telephone wire, or through the ether as radio waves. The energy, thus transmitted, is then deconverted by appropriate circuits into its original three voltage level form with the additional production of a signal complementary thereto. Both the deconverted signal and its complement are applied through clipper circuits which, in turn, act to clip or remove all of the relatively low voltage level magnitudes therefrom. The signals thus remaining have only two voltage levels which when combined in another mixer circuit, furnish a clocking or timing signal having a waveshape identical to the original timing signal. These clipped signals are likewise applied to the two input terminals of a flip-flop circuit, the resultant triggering thereof producing an output signal of identical configuration to the original binary information signal.

It is therefore, the principal object of the present invention to provide a device for combining and transmitting binary digit and clocking information simultaneously over a single channel.

Another object of the present invention is to provide a device for combining binary digit information and timing signal information, transmitting the combined information over a single channel, and separating the combined information as received from the single channel into the original binary digit and timing signal information.

A further object of the present invention is to provide a device for combining a pair of signals representing binary number and timing information into a single signal without loss of data.

A still further object of the present invention is to provide a device for combining a pair of signals representing two types of information, respectively, without loss of either type of information.

Another object of the present invention is to provide a device for simultaneously transmitting two distinct types of information over a single channel.

Other objects and features of the present invention will be readily apparent to those skilled in the art from the following specification and appended drawings wherein is illustrated a preferred form of the invention, and in which.

Figures 1, 2, 3:
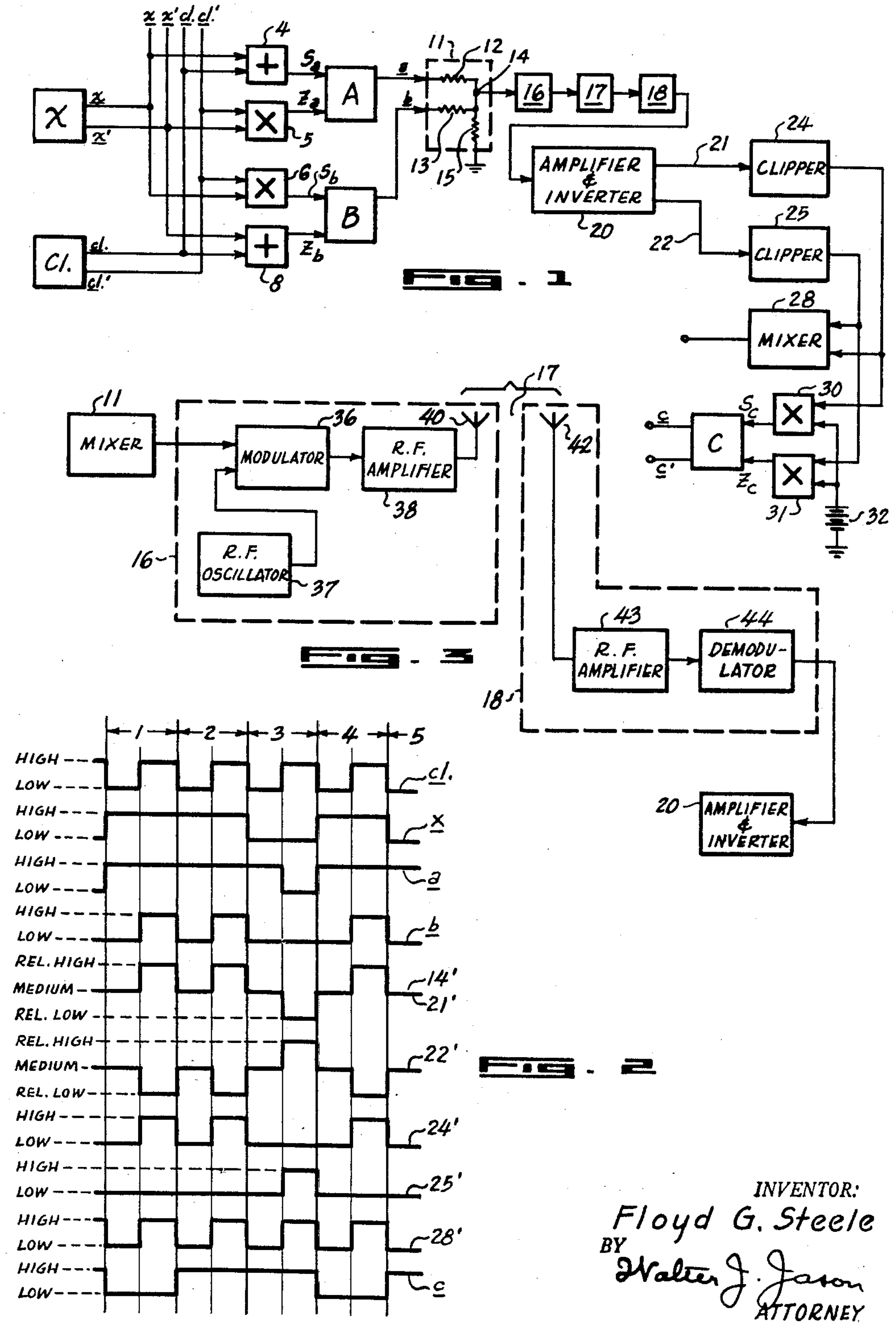
Fig. 1 is a circuit diagram, partly in block schematic form, of the device of the present invention.
Fig. 2 is a group of signal waveforms illustrating the principles of operation of the device according to Fig. 1.
Fig. 3 is an expanded circuit diagram of a portion of the circuit of Fig. 1.

Referring now to Fig. 1, there is illustrated an electronic switching device, such as flip-flop X producing a pair of complementary output signals $x$ and $x'$ and another electronic switching device, such as flip-flop $Cl$, producing a pair of complementary output signals $cl$ and $cl'$. As will be brought forth later, signal $cl$ is the timing signal and signal $x$ is the binary information signal which are to be later combined and transmitted over the single channel.

Signals $x$ and $cl$ are applied to the two input terminals of an "or" gating circuit 4, the output terminal of which is connected to the $S_a$ input conductor of an electronic switching device, such as flip-flop A. Signals $cl'$ and $x'$ are applied to the two input terminals of an "and" gating circuit 5, the output terminal of which is connected to the $Z_a$ input conductor of flip-flop A.

Signals $x$ and $cl'$ are applied to the two input terminals of another "and" gating circuit 6, the output terminal of which is connected to the $S_b$ input conductor of an electronic switching device, such as flip-flop B. Signals $x'$ and $cl$ are applied to the two input terminals of an "or" gating circuit 8, the output terminal of which is connected to the $Z_b$ input conductor of flip-flop B. The pair of output signals $a$ and $b$ of flip-flops A and B, respectively, are applied through resistors 12 and 13, respectively, to a common junction 14, junction 14 being coupled to ground through another resistor 15. Resistors 12, 13 and 15 comprise a mixer circuit 11.

Junction 14 is also coupled to an output conversion device 16, whose output signal, in turn, is transmitted over a single transmission path or medium 17, here indicated generally. This transmitted signal is received from the path by an input conversion device 18, the output signal of which is applied to an amplifier and inverter 20. Amplifier and inverter 20 has two output conductors 21 and 22, which, in turn, are coupled to a pair of clipper circuits, 24 and 25, respectively. The output terminals of circuits 24 and 25 are coupled both to the two input terminals of a mixer 28, and to one input terminal each of "and" gating circuits 30 and 31, respectively. The other input terminals of gating circuits 30 and 31 are coupled to the positive terminal of a source of potential, such as battery 32, the negative terminal thereof being coupled to ground.

The output terminals of gating circuits 30 and 31 are, in turn, coupled to the $S_c$ and $Z_c$ input conductors, respectively, of an electronic switching device, such as flip-flop C, flip-flop C producing a pair of complementary output signals $c$ and $c'$ on its two output terminals. As will be later shown, the signal appearing on the output terminal of mixer 28 is identical in wave shape to signal $cl$ produced by flip-flop C1, with signal $c$ of flip-flop C being identical in wave shape to signal $x$.

The representation herein employed for the various flip-flop circuits as well as the "and" and "or" gating circuits is identical to that employed in the U.S. Patent No. 2,898,040, entitled "Computer and Indicator System," issued August 4,1959, to Floyd G. Steele. Also, the specific circuitry of the various flip-flops and gating circuits herein illustrated may be identical to that described and illustrated in the above referred to patent.

As stated before, the present invention contemplates a device for combining a binary information signal and a timing signal so as to appear simultaneously in a single signal and hence be transmittable over a single channel. Signal $cl$ represents the timing information and comprises a series of alternate high and low voltage levels, each adjacent low and high voltage level thereof marking or indicating, as is hereinafter termed, a single timing interval. Signal $x$ represents a series of binary digits, each high voltage level thereof appearing for one timing interval representing a binary digit value of one, with each low voltage thereof appearing for one timing interval representing a binary digit value of zero.

Referring now briefly to Fig. 2, there is illustrated timing signal $cl$ as it appears during first, second, third and fourth designated timing intervals. Also illustrated is signal $x$, signal $x$ comprising, by way of example only, a high voltage level for the first, second and fourth timing intervals and a low voltage level during the remaining third timing interval.

Before considering further the gating circuitry connected between flip-flops X and C1 and the input conductors of flip-flops A and B, it is well at this point to consider the operation of mixer 11 as it relates to signals $a$ and $b$. If output signals $a$ and $b$ of flip-flops A and B, respectively, are clamped, as is preferable, so as to have identical high voltage levels and identical low voltage levels, then resistors 12 and 13 should be of the same resistance value. With these parameters established, it is evident that the voltage appearing at junction 14 will take three values. Thus, when signals $a$ and $b$ are each at their high voltage level, a relatively high voltage level will appear at junction 14 while, on the other hand, when signals $a$ and $b$ are at different voltage levels, that is, at high and low levels, or at low and high levels, respectively, the voltage at junction 14 will be at, as is hereinafter termed, a medium voltage level. Finally, when signals $a$ and $b$ are simultaneously at their low voltage levels, then a relatively low voltage level will appear on junction 14.

For reasons which will become apparent later, flip-flops A and B are to be triggered to produce different output voltage levels in signals $a$ and $b$, respectively, during the first half of each timing interval. More specifically, signals $a$ and $b$ are to be high and low, respectively, during such periods. Also, the flip-flops are to be triggered so as to produce simultaneous high or low levels during the last half of each interval corresponding to a high or low level, respectively, appearing in the binary information signal $x$ during that timing interval.

The results of these defined triggering operations are found in the signal $a$ and $b$ waveforms as illustrated in Fig. 2. Thus, signals $a$ and $b$ are at their high and low voltage levels, respectively, during the first half of the first timing interval. During the last half of this first interval, both signals are at their high voltage level and thus correspond to the high voltage level of signal $x$ during the same interval. Signals $a$ and $b$ are again at their high and low levels, respectively during the first half of the second timing interval and are at their high levels during the last half thereof to thereby correspond to the high voltage level in signal $x$ during the second timing interval. The signal waveforms illustrated for the remaining timing intervals may be readily understood in this same manner.

The gating circuitry found between the signal $x$, $x'$, $cl$ and $cl'$ conductors and the $S_a$, $Z_a$, $S_b$, and $Z_b$ input conductors of flip-flops A and B produces the above set forth results. Such gating circuits are mechanizations of corresponding Boolean or logical equations which may be derived, as appreciated by those skilled in the art, from appropriate tables wherein is set forth the desired output signal and triggering relationships. In particular, the equations are:

$$S_a = cl + x \quad \text{(Eq. 1)}$$
$$Z_a = cl' \cdot x' \quad \text{(Eq. 2)}$$
$$S_b = cl' \cdot x \quad \text{(Eq. 3)}$$
$$Z_b = cl + x' \quad \text{(Eq. 4)}$$

The signal, generally designated 14' in Fig. 2, appearing on junction 14 in mixer 11 is illustrated and is, as explained previously in connection with the description of the operation of mixer 11, a combination of signals $a$ and $b$. As noted previously, when signals $a$ and $b$ are simultaneously high, then signal 14' will be at a relatively high voltage level, while when signals $a$ and $b$ are simultaneously low, signal 14' will be at a relatively low level. Also, when signals $a$ and $b$ are at different voltage levels, signal 14' will be at a medium level.

The specific structure of output conversion device 16 is determined by the type of medium or path utilized to transmit signal 14'. For example, if the medium is a single wire transmission system, such as a telegraph or telephone line, then device 16 might comprise appropriate amplifiers, oscillators, and impedance matching circuits as commonly used in the art. On the other hand, if the medium chosen is ether as for radar and radio signals, for example, then conversion device 16 would comprise suitable amplifiers, and carrier wave generators, modulators, antennas, etc. In particular, there is later shown and described in Fig. 3, the specific details of a suitable radio linkage.

If a single wire were used for the transmission system, then an audio signal could be modulated so as to have three amplitudes corresponding to the three signal 14' levels. Furthermore, if a frequency-modulated radio signal were used, then three separate carrier wave frequency excursions could be employed, the three excursions corresponding to the three levels of signal 14'. As is also apparent, if the distance between mixer 11 and amplifier and inverter 20 is not too great, then a single conductor might be connected directly between junction 14 and the input terminal of amplifier and inverter 20 with the omission of conversion devices 16 and 18. In this latter case, a ground return between the two circuits would complete the circuit. In any event, if resistors 12 and 13 are substantially equal in value, as should be the case if signals $a$ and $b$ have substantially the same high and the same low voltage levels, then the absolute magnitude of resistors 12, 13 and 15 will be determined by the input impedance characteristics of device 16 employed, or by the single conductor in the last example cited.

The input conversion device 18 will be determined by the type of medium 17 utilized and will perform essentially, the complementary or inverse function to that performed by conversion device 16. For example, if a wire transmission medium is used with audio frequency signals, then device 18 may comprise appropriate input impedance matching networks, amplifiers, and demodulators. On the other hand, if medium 17 is the ether as used for the transmission of radio waves, then device 18 may include an antenna, amplifier, demodulator, etc., as later illustrated and described in connection with Fig. 3. The output signal from conversion device 18 will have essentially the same waveform as signal 14' and is amplified by amplifier and inverter 20 to appear without change in waveshape on output conductor 21. This output signal, appearing on conductor 21, is generally designated 21' in Fig. 2, and for convenience is indicated concurrently with signal 14', the two having identical waveshapes. Amplifier and inverter 20 also inverts or complements the signal appearing at the output terminal of device 18, the inverted signal, generally designated 22' in Fig. 2, appearing on output conductor 22. In particular, the relatively high and low voltage levels of the signal appearing on the output terminal of device 18 are inverted to relatively low and high voltage levels, respectively, with each medium voltage level remaining as a medium voltage level.

Clippers 24 and 25 are similar in structure and serve to clip or cut off all relatively low voltage levels in signals 21' and 22' at the medium voltage level. Thus, the output signal, generally designated 24' in Fig. 2, produced by clipper 24 contains, as is hereafter termed, a high voltage level during the last half of the first, second and fourth timing intervals while the output signal, generally designated 25' in Fig. 2 produced by clipper 25, contains, as is hereafter termed a high voltage level during the last half of only the third timing interval. The remaining portions of signals 24' and 25' are at, as termed hereafter, the low, rather than medium voltage level. As will be appreciated by those skilled in the art, clippers 24 and 25 may consist simply of a pair of diodes connected between output conductors 21 and 22, respectively, and a source of potential having the medium voltage level of signals 21' and 22'.

Output signals 24' and 25' are applied to the two input terminals of a mixer 28, which may be similar in structure to mixer 11 previously illustrated. Mixer 28, in turn, combines these signals to produce an output signal, generally designated 28' in Fig. 2, on its output terminal. Thus, each high voltage level in signals 24' and 25' acts to produce a high voltage level in signal 28'. Therefore, since a high voltage level always appears during the last half of each timing interval in one of signals 24' and 25', a high voltage level will accordingly appear in signal 28' during the last half of each interval. Since the low level appears during the first half of each interval in signals 24' and 25', the signal 28' will contain, during such periods, a low voltage level. Signal 28', as will be seen, thus comprises a series of alternate low and high voltage levels, each of which lasts for one-half of a timing interval as measured by signal *cl*. Thus, signal 28' has the same waveshape as signal *cl*, and hence represents the timing signal component of the original input information.

Signal 24' is also applied, as stated previously, to one input terminal of an "and" gating circuit 30, the other input terminal thereof being coupled to the positive terminal of battery 32. The voltage of battery 32 is substantially equal to the high voltage level attained by signal 24'. In operation, whenever signal 24' is at its high voltage level, then circuit 30 is prepared for delivering a triggering signal to the $S_c$ input conductor of flip-flop C. This triggering signal is delivered at the instant signal 24' switches to its low voltage level, as will be understood from the combined operation of gating circuits and flip-flops, the result being that if output signal *c* were at its low level, then the conduction state of flip-flop C would be reversed and signal *c* would switch to its high voltage level. If signal *c* were initially high, then no change in the conduction state of flip-flop C would be effected by such a triggering signal and signal *c* would remain high.

In the same way, signal 25' is applied to one input terminal of "and" gating circuit 31, similar to "and" gating circuit 30, with the other input terminal thereof being coupled to battery 32. Thus, whenever signal 25' reaches its high voltage level, circuit 31 is prepared for delivering a triggering signal to the $Z_c$ input conductor of flip-flop C. As before, when signal 25' switches to its low voltage level, a triggering signal is produced and signal *c* either assumes or remains at its low voltage level depending on whether it was initially high or low, respectively.

Referring back to Fig. 2, there is illustrated signal *c* and, as may be seen, at the end of the first timing interval when signal 24' switches from its high to its low voltage level, signal *c* changes from its initial low to its high voltage level. This high voltage level continues until the end of the third timing interval, at which time signal 25' switches from its high to its low level with the result that signal *c* switches to its low voltage level. As will be seen, the additional triggering signal applied from gating circuit 30 at the end of the second timing interval when signal 24' switches from its high to low voltage level will be ineffective to change the conduction state of flip-flop C since, as has already been pointed out, at that time signal *c* will already be at its high voltage level.

A comparison of signal *c* and *x* reveals that signal *c* contains the identical binary number information originally appearing in signal *x* but delayed one timing interval therefrom. Thus, signals 28' and *c* contain the clocking signal information and the binary number information as were originally present in signals *cl* and *x*, respectively. Accordingly, it has been demonstrated that the device of the present invention is capable of combining both clocking and numerical information to form a single signal which, in turn, is transmittable over a single channel, with the signal received from such transmission being capable of being deconverted into the same two component signals originally utilized to form it.

As will be apparent to those skilled in the art, other means exist for triggering final flip-flop C other than the one herein specifically illustrated. Also, other types of switching devices such as relay circuits may be employed instead of the specific flip-flops illustrated without involving invention.

Also, the information contained in the voltage levels of signal *x*, here discussed as relating to binary digit values, may obviously relate to other forms, such as quantized off-on information, di-function information, etc.

Referring now to Fig. 3, there is illustrated, by way of example only, one possible embodiment of output conversion device 16, transmission path 17, and input conversion device 18. In particular, the output signal of mixer 11 is applied to one input terminal of a modulator circuit 36, while the output signal of a radio-frequency oscillator 37 is applied to another input terminal thereof. The output signal of modulator 36 is applied to the input terminal of a radio-frequency amplifier 38, the output signal of which is impressed on an antenna 40. The conversion device 18 includes an antenna 42 coupled to the input terminal of a radio-frequency amplifier 43, the output signal of which is applied to a demodulator circuit 44. The output signal of demodulator 44, in turn, comprises the output signal of device 18 which is, as stated before, applied to amplifier and inverter 20.

In operation, oscillator 37 produces a radio-frequency carrier wave which, in turn, is modulated by modulator 36 to a series of three amplitudes in accordance with the three voltage levels appearing on junction 14 of mixer 11. This modulated carrier signal is then amplified by amplifier 38 and radiated as radio waves from antenna 40. The transmission path 17, in this case is, of course, the ether, with the modulated carrier signal being received by antenna 42, amplified by radio-frequency amplifier 43 and then demodulated by demodulator 44 back to the corresponding three voltage levels originally present in the output signal 14' of mixer 11.

I claim:

1. A device for use with a source of a binary digit information signal and a timing signal, said timing signal comprising a series of alternate low and high voltage levels, each adjacent low and high level thereof marking a timing interval, said binary digit information signal comprising a series of alternate high and low voltage levels, each of said levels appearing for an integral number of timing intervals, said device comprising: selectively actuable means for producing relatively high, relatively low or medium voltage levels; first means for actuating said selectively actuable means to produce said medium voltage level during one-half of each timing interval; and second means responsive to the high or low voltage level in the information signal each timing interval for actuating said selectively actuable means to produce the relatively high or relatively low voltage level, respectively, during the remaining half of the corresponding timing interval.

2. The device of claim 1 including, in addition, means for transmitting the output voltage levels produced by said selectively actuable means, and means responsive to the transmitted voltage levels for producing a first signal corresponding to the binary information signal and a second signal corresponding to the timing signal.

3. The device of claim 1 including, in addition, means for converting the voltage levels produced by said selectively actuable means into a transmission signal, means for transmitting said transmission signal over a transmission path, means responsive to the transmitted signal for reproducing the series of voltage levels produced by said selectively actuable means; and means responsive to the voltage levels reproduced by the last-named means for producing a first signal corresponding to the binary information signal and a second signal corresponding to the timing signal.

4. In combination: 1st and 2nd electronic switching means, each of said switching means producing alternate high and low output voltage levels; means responsive to a pair of high voltage levels, a pair of low voltage levels, and a high and low voltage level for producing a relatively high, a relatively low, and a medium voltage level, respectively; and means for applying the alternate high and low output voltage levels of said 1st and 2nd switching means to the last-named means whereby the voltage levels produced by the last-named means represent a combination of the information contained in the output voltage levels of the 1st and 2nd switching means.

5. In combination: first and second means producing first and second information signals, respectively, each of said information signals comprising a series of first and second voltage levels; means for combining said first and second information signals to produce third and fourth signals each comprising a series of relatively high and low levels, the relatively high levels of said third signal and the relatively low levels of said fourth signal representing the first and second levels, respectively, of said first information signal; and means for combining said third and fourth signals to produce a fifth signal having a series of three voltage levels, said fifth signal containing all of the information in said first and second signals.

6. The device of claim 5 including, in addition, means for transmitting said fifth signal over a transmission path; and means responsive to the transmitted fifth signal for producing sixth and seventh signals similar in form to said first and second signals, respectively.

7. In combination: first and second means producing first and second information signals, respectively, each of said information signals comprising a series of first and second voltage levels; means for combining said first and second signals to produce third and fourth signals, said third signal normally having a third level and having a fourth level whenever said first and second signals are both at said first level, said fourth signal normally having said fourth level and having said third level when said first and second signals are at said first and second levels, respectively; and means responsive to the simultaneous appearance of the fourth, the third, and different voltage levels in said third and fourth signals for producing a relatively high, a relatively low, and a medium voltage level, respectively, in a fifth signal.

8. The device of claim 7 including,, in addition, means for transmitting said fifth signal over a transmission path; means responsive to said transmitted signal for producing a sixth signal having the identical sequence of relatively high, relatively low and medium voltage levels of said fifth signal; means responsive to said sixth signal for separating said sixth signal into seventh and eighth signals, each of said seventh and eighth signals comprising a series of high and low voltage levels, corresponding to the series of high and low voltage levels in said first and second information signals, respectively.

9. A device for use with a computer system producing a binary digit information signal and a timing signal, said timing signal comprising a series of alternate low and high voltage levels, each adjacent low and high level thereof marking a timing interval, said binary digit information signal comprising a series of alternate high and low voltage levels, each of said levels appearing for an integral number of timing intervals, said device comprising: first and second electronic switching means, each of said switching means being actuable to produce first or second output voltage levels; first means for actuating said first and second switching means for producing first and second output voltage levels, respectively, for one-half of each timing interval; second means responsive to the high or low voltage levels in the binary digit information signal each timing interval for actuating said first and second switching means for simultaneously producing the first or second voltage levels, respectively; first mixing means responsive to a pair of first voltage level input signals, a pair of second voltage level input signals, or first and second voltage level input signals for producing a relatively high, a relatively low, or a medium output voltage level; and means for applying the output voltage levels of said switching means to said mixing means whereby the series of output voltage levels produced by said mixing means represents both the binary digit information signal and the timing signal.

10. The device of claim 9 including, in addition, means for converting the series of output voltage levels produced by said mixing means into a corresponding signal suitable for transmission over a transmission path; means for transmitting the signal produced by the last-named means over the transmission path; deconverter means responsive to the transmitted signal for reproducing the series of output voltage levels of said first mixing means; inverter means for inverting the series of voltage levels produced by said deconverter means; first and second clipper means for changing the relatively low voltage levels in the output signals of said deconverter and said inverter means, respectively, into the medium voltage level; second mixing means for combining the clipped output signals from said first and second clipper means whereby the series of output voltage levels of said second mixing means are similar in waveform to the timing signal; third electronic switching means producing high and low output voltage level signals in response to first and second input signals, respectively; and means for applying first and second input signals to said third electronic switching means in response to each relatively high voltage level in the clipped output signals produced by said first and second clipper means, respectively, whereby the series of output voltage levels produced by said third switching means correspond to said series of binary digit information signal voltage levels.

11. A device for use with a source of first and second information signals, each of said signals having a series of first and second voltage levels, said device comprising: first means for combining said first and second signals to produce a third signal normally having a relatively low voltage level and having a relatively high voltage level whenever said first and second signals are at said first level; second means for combining said first and second signals to produce a fourth signal normally having a relatively high voltage level and having a relatively low voltage level when said first and second signals are at said first and second voltage levels, respectively; and third means for combining said third and fourth signals to produce an output signal having three voltage levels.

12. A device for use with a source of first and second information signals, each of said signals having a series of alternate relatively high and relatively low voltage levels, said device comprising: selectively actuable means for producing an output signal having relatively high, relatively low or medium voltage levels; first means for actuating said selectively actuable means to substantially reproduce one of said first and second signals when the other of said first and second signals is at said relatively high level; and second means for actuating said selectively actuable means to substantially reproduce the inversion of said one signal when said other signal is at said relatively low voltage level.

13. A device for use with a source of a binary digit information signal and a timing signal, said timing signal comprising a series of alternate low and high voltage levels, each adjacent low and high level thereof marking a timing interval, said binary digit information signal comprising a series of alternate high and low voltage levels, each of said levels appearing for an integral number of timing intervals, said device comprising: selectively actuable means for producing relatively high, relatively low or medium voltage levels; first means for actuating said selectively actuable means to reproduce the high and low levels of said timing signal as said relatively high and medium levels, respectively when said information signal is at one of said high and low levels, and second means for actuating said selectively actuable means to reproduce said high and low levels of said timing signal as said relatively low and medium levels, respectively, when said information signal is at the other of said high and low levels.

References Cited in the file of this patent

UNITED STATES PATENTS

| | | |
|---|---|---|
| 2,554,886 | Stedman | May 29, 1951 |
| 2,570,249 | Kenyon | Oct. 9, 1951 |
| 2,582,957 | Borsum et al. | Jan. 22, 1952 |
| 2,592,737 | Reynolds et al. | Apr. 15, 1952 |
| 2,618,706 | Kalfaian et al. | Nov. 18, 1952 |
| 2,700,696 | Barker | Jan. 25, 1955 |
| 2,824,172 | Cherry | Feb. 18, 1958 |

FOREIGN PATENTS

| | | |
|---|---|---|
| 558,298 | Great Britain | Dec. 30, 1943 |